Patented May 28, 1935

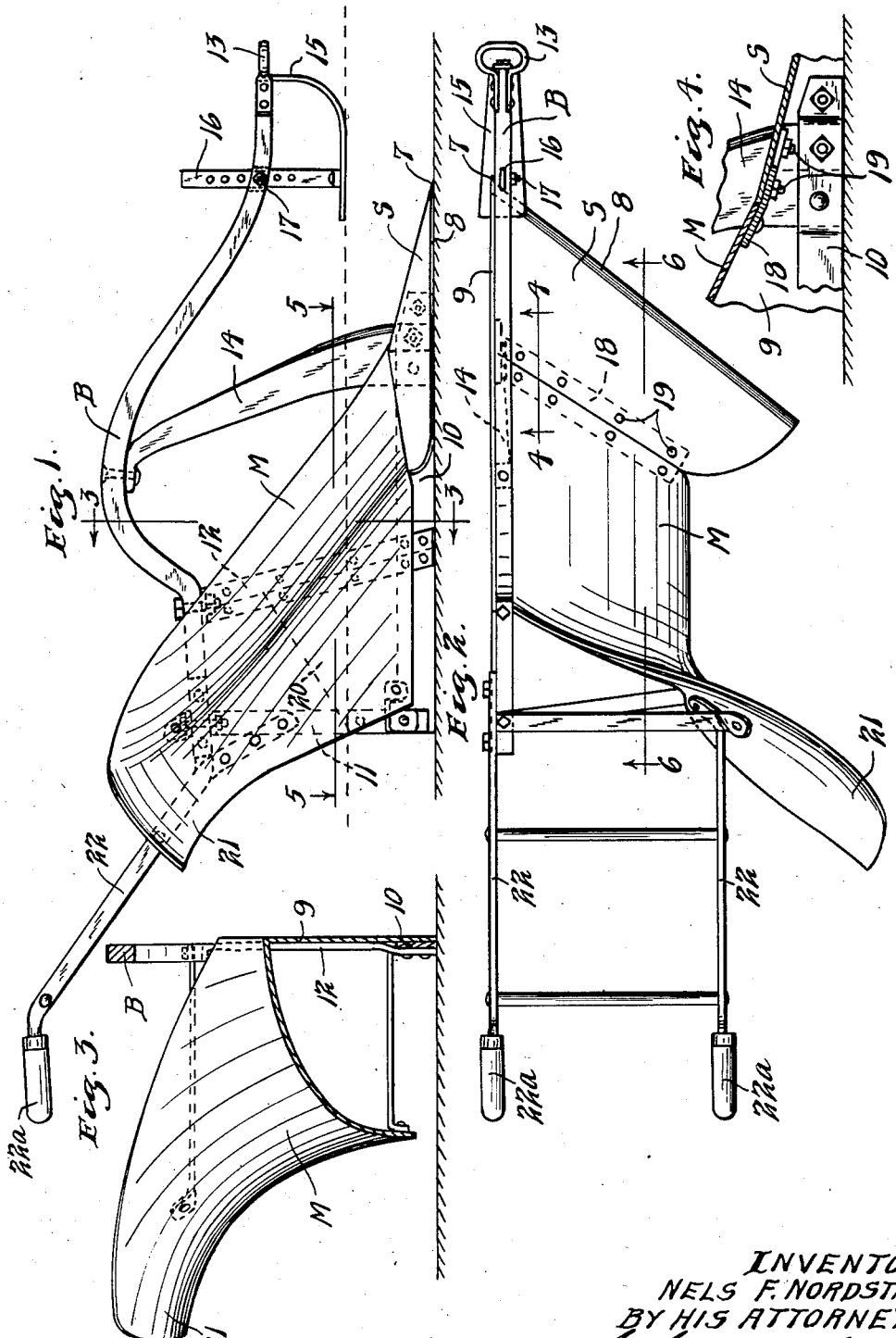

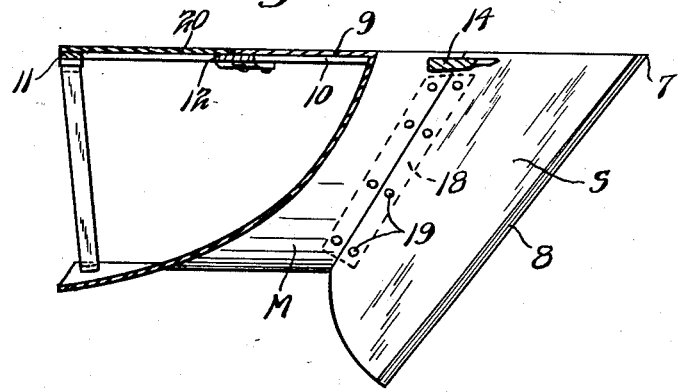
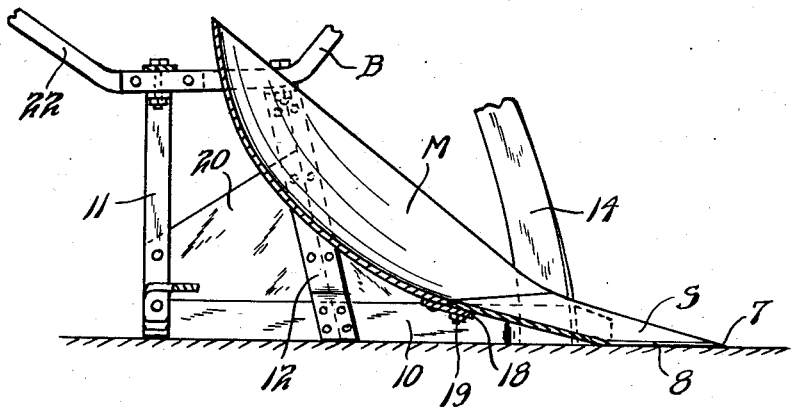

2,002,751

UNITED STATES PATENT OFFICE 2,002,751

PLOW

Nels F. Nordstrom, Minneapolis, Minn.

Application May 1, 1933, Serial No. 668,789

1 Claim. (Cl. 97—115)

This invention relates to plows and is adapted for incorporation in most types of plows, such as walking plows, sulky plows and gang plows.

It is an object of my invention to provide a plow constructed for heavy work and scientifically formed to give the least draft resistance possible in cutting the soil and turning the furrow slice.

It is a further object to provide a strong, rigid plow construction which will withstand hard and heavy usage, which includes means for regulating the cutting depth and which is equipped with means permitting the shares to be readily detached or replaced.

The novelty of greatest importance is in the formation or construction of the mold board, with a view to perfectly moving and turning the furrow slice with the least possible draft resistance.

These and other objects and advantages of the invention will be more fully set forth in the following description made in connection with the accompanying drawings, in which like reference characters refer to similar parts throughout the several views, and in which:—

Fig. 1 is a side elevation of a walking plow embodying my invention;

Fig. 2 is a top plan view;

Fig. 3 is a cross section taken on the line 3—3 of Fig. 1;

Fig. 4 is a detail cross section taken on the line 4—4 of Fig. 2;

Fig. 5 is a horizontal cross section taken on the line 5—5 of Fig. 1, and

Fig. 6 is a vertical section taken approximately on the line 6—6 of Fig. 2.

In the drawings an embodiment of my invention as applied to a walking plow is illustrated. It, of course, will be understood that the invention is equally applicable to sulky, gang and other plows.

In the form disclosed the share S is provided with a relatively flat point 7, the usual cutting edge 8 disposed diagonally of the landside 9. The landside of the share overlaps and is detachably secured to a horizontal bar or frame member 10 to which is rigidly secured the upstanding bars or standards 11 and 12. Standard 11, it will be noted, is at the rear of the plow and as shown is disposed vertically, while standard 12 is disposed some distance forwardly of standard 11 and is inclined somewhat from the vertical. The upper ends of standards 11 and 12 are bolted or otherwise rigidly secured to the rear end of the beam B which terminated at its forward end in a draft loop or eye 13 for connection with a clevis. A standing cutter blade 14 is rigidly secured between the medial portion of beam B and the landside 9 of the share and is disposed at the appropriate distance rearwardly of the share point 7. It will be noted that the draft connection 13 at the forward end of the beam is disposed somewhat forwardly of the share point.

Swingably mounted below the forward end of beam B is a depth regulating shoe 15 carrying an upstanding adjustment brace 16 which works through a slot formed in the beam. Brace 16 is provided with a series of apertures through any one of which a bolt 17 may pass to secure the shoe in a desired relation with reference to the share 7.

The cutting edge 8 of the share S is considerably longer than the lower or forward end of the mold board M and said share at its rear edge is detachably secured by means of bolts or the like.

The forward or lower edge of the mold board has rigidly secured thereto an attachment plate 18 to the projecting forward longitudinal edge of which the share S is detachably secured by suitable means, such as the nutted bolts 19. The landside 9 of the share, as shown, fits beneath and registers with a triangular landside plate 20 which may be integrally formed with or rigidly secured to the mold board M.

The lower or forward edge of the mold board is shaped to continue the contour of the share. The mold board is curved convexly in horizontal cross section, as will be apparent from Figs. 2, 3 and 5, presenting the correct contour to nicely force the furrow slice outwardly with the least draft resistance.

The working surface or contour of the mold board is concaved rearwardly and upwardly, as will be apparent from an inspection of Figs. 2 and 6, terminating at its upper end and on the furrow side in an overhanging wing 21. The wing is shaped as a symmetrical continuation of the contour of the body portion of the mold board.

A pair of suitable handle bars 22 are rigidly secured at their forward ends to the frame and back of the mold board respectively and extend rearwardly and upwardly, terminating in handle members 22a.

In operation the soil will be cut by the blade edge 8 of the share and by the upright cutter 14. The cut soil or furrow slice then is moved upwardly and outwardly by the compound curved working surface of the mold board M. The "easy" convex curve of the mold board in horizontal cross section, as well as in vertical cross section, as will be apparent from a study of Figs.

5 and 3 respectively, causes the outward and turning movement of the furrow slice with the least draft resistance possible. The slice is turned gradually and uniformly as it is moved upwardly and rearwardly by the curved contour previously mentioned and the combined concave contour extending upwardly and rearwardly. The slice disengages the mold board at the tip of wing 21 at which time it is completely turned and drops flat upon the soil.

It will be apparent that the cutting depth of the plow may be regulated by adjusting shoe 15. The shoe and adjustment means have been found highly effective in that the shoe will not sink readily in soft soil, as is the case with most wheels utilized for depth regulation.

It will be apparent that the share including the landside 9 may be very quickly detached from the device for sharpening or replacement. In this connection it will be noted that the landside snugly fits a recess afforded below the landside plate 20 and is reinforced by abutment with edges on its upper longitudinal portion and its rearward end.

From the foregoing description it will be apparent that I have invented a simple, improved plow construction, ruggedly built for heavy work and scientifically constructed to minimize draft resistance in cutting the soil and turning the furrow slice. The slice is turned uniformly and scientifically in its movement from the blade of the share to the tip of wing 21.

It will, of course, be understood that various changes may be made in the form, details, proportions and arrangement of the parts, without departing from the scope of my invention, which, generally stated, consists in a device capable of carrying out the objects above set forth, and in the novel parts and combinations of parts disclosed and defined in the appended claim.

What is claimed is:—

In plow construction, a share having the usual point, landside and cutting edge, a mold board, the lower or forward edge of which is contoured to in effect form a continuation of the coutour of the rear edge of said share, the working surface of said mold board being curved convexly in horizontal cross section and being concave rearwardly and upwardly throughout its entire length and having a wing at its upper end opposite to said landside, said wing being shaped as a continuation of the contour of the body of said mold board and being also curved convexly in horizontal cross section and being curved concavely in a longitudinal direction.

NELS F. NORDSTROM.